US011745655B2

(12) United States Patent
Traxler (10) Patent No.: US 11,745,655 B2
(45) Date of Patent: Sep. 5, 2023

(54) METHOD FOR DISPLAYING AND/OR CALCULATING A RELATIVE MOVEMENT

(71) Applicant: EYYES GMBH, Gedersdorf (AT)

(72) Inventor: Johannes Traxler, Imbach (AT)

(73) Assignee: EYYES GMBH, Gedersdorf (AT)

( * ) Notice: Subject to any disclaimer, the term of this patent is extended or adjusted under 35 U.S.C. 154(b) by 145 days.

(21) Appl. No.: 17/611,463

(22) PCT Filed: May 13, 2020

(86) PCT No.: PCT/EP2020/063282
§ 371 (c)(1),
(2) Date: Nov. 15, 2021

(87) PCT Pub. No.: WO2020/229515
PCT Pub. Date: Nov. 19, 2020

(65) Prior Publication Data
US 2022/0212598 A1    Jul. 7, 2022

(30) Foreign Application Priority Data

May 14, 2019  (DE) .................... 10 2019 112 625.8
Mar. 10, 2020  (AT) .............................. A 50199/2020

(51) Int. Cl.
*H04N 5/44*  (2011.01)
*B60Q 9/00*  (2006.01)
(Continued)

(52) U.S. Cl.
CPC ............ *B60Q 9/008* (2013.01); *B60W 30/08* (2013.01); *B60W 50/14* (2013.01);
(Continued)

(58) Field of Classification Search
CPC ....... B60Q 9/008; B60W 30/08; B60W 50/14; B60W 2050/143; B60W 2420/42;
(Continued)

(56) References Cited

U.S. PATENT DOCUMENTS 6,091,323 A  *  7/2000  Kawai ................... B60Q 9/008
340/436
2004/0061598 A1    4/2004  King
(Continued)

FOREIGN PATENT DOCUMENTS

CN           108725440 A    11/2018
DE           10030421 A1    1/2001
(Continued)

OTHER PUBLICATIONS

International Search Report and Written Opinion in International Application No. PCT/EP2020/063282, dated Aug. 12, 2020, 15 pages.

*Primary Examiner* — Munear T Akki
(74) *Attorney, Agent, or Firm* — Liang & Hennessey LLP; Brian Hennessey (57) ABSTRACT

A method for displaying and/or calculating relative movement of a second moved object to a first moved object, wherein a future first change in position of the first object is calculated from an expired first change in position, and wherein a future second change in relative position of the second object is calculated from an expired second change in relative position, which future first change in position is compared with the future second change in relative position.

13 Claims, 4 Drawing Sheets

(51) Int. Cl.
*B60W 30/08* (2012.01)
*B60W 50/14* (2020.01)

(52) U.S. Cl.
CPC ... *B60W 2050/143* (2013.01); *B60W 2420/42* (2013.01); *B60W 2554/402* (2020.02); *B60W 2554/4041* (2020.02)

(58) Field of Classification Search
CPC ... B60W 2554/402; B60W 2554/4041; B60W 30/0956; B60W 2554/4026; B60W 2554/4045; G01S 5/01; G08G 1/163
See application file for complete search history.

(56) References Cited

U.S. PATENT DOCUMENTS

| | | | | |
|---|---|---|---|---|
| 2004/0090320 | A1* | 5/2004 | Suzuki | B60T 7/22 701/1 |
| 2005/0016550 | A1 | 1/2005 | Katase | |
| 2007/0188347 | A1* | 8/2007 | Schofield | G01S 13/931 340/903 |
| 2010/0085238 | A1* | 4/2010 | Muller-Frahm | G01S 13/867 342/70 |
| 2011/0087433 | A1* | 4/2011 | Yester | G08G 1/096716 701/469 |
| 2011/0307175 | A1* | 12/2011 | Gandhi | G08G 1/166 701/301 |
| 2014/0019005 | A1* | 1/2014 | Lee | G08G 1/0962 701/301 |
| 2015/0085119 | A1* | 3/2015 | Dagan | G06T 7/20 348/148 |

FOREIGN PATENT DOCUMENTS

| | | |
|---|---|---|
| DE | 102016113903 A1 | 3/2017 |
| EP | 0582236 A1 | 2/1994 |
| JP | H0660300 A | 3/1994 |
| JP | 2019053377 A | 4/2019 |
| WO | 2017177088 A1 | 10/2017 |

* cited by examiner

METHOD FOR DISPLAYING AND/OR CALCULATING A RELATIVE MOVEMENT

CROSS-REFERENCE TO RELATED APPLICATIONS

The present application is a national phase application of PCT Application No. PCT/EP2020/063282, filed May 13, 2020, entitled "METHOD FOR DISPLAYING AND/OR CALCULATING RELATIVE MOVEMENT", which claims the benefit of Austrian Patent Application No. A50199/2020, filed Mar. 10, 2020, and German Patent Application No. 10 2019 112 625.8, filed May 14, 2019, each of which is incorporated by reference in its entirety.

BACKGROUND OF THE INVENTION

1. Field of the Invention

The invention disclosed herein relates to a method for displaying and/or calculating relative movement of a second moved object to a first moved object and optionally for preventing a collision between the first moved object and the second moved object.

2. Description of the Related Art

Methods of prior art such as DE10030421, for example, are limited in that an expired change in relative position of the second object is determined from at least two relative positions of the object at a time Tv. A future change in relative position of the second object at at least one time T1 . . . Tn is calculated from the expired change in relative position of the second object. The calculation follows prior art assuming continuation of the expired change in relative position at times t1 . . . tn in the future change in relative position at times T1 . . . Tn. In other words, it is assumed that, as seen in the global coordinate system, the first object and the second object continue their movements performed prior to time Tv essentially without any changes in changes in relative positions after time TV, so that the relative movement of the second object to the first object remains unchanged.

It is thus assumed in prior art that an object, which object is moved along a straight line at times t1 . . . n, will be moved along a straight line at times T1 . . . n as well. When an object is moved along a curve at times t1 . . . n, it can be assumed that the object will be moved in continuation of said curve at times T1 . . . n.

A superposition of changes in relative position is a mathematical description of a collision of the first object and the second object at a time Tk. A collision occurs when a first vector describing a first change in position and a second vector describing a second change in relative position intersect at time Tk.

The method described in DE10030421 is by no means suitable for predicting a potential collision in an area in which an object makes a change in direction. The method disclosed in DE10030421 cannot be employed for an area of intersection.

JPH0660300 and EP0582236 disclose a method for detecting a collision via image analysis by applying AI. This document does not mention the analysis of movements calculating changes in relative position.

The method described in US2005016550 is based on the analysis of movement paths, not movement areas.

WO2017177088 discloses a method based on neural networks, in which method images of the scene are analyzed.

No indication of observing a change in relative position of the second object and a movement area describing the potential changes in relative position of the second object is found in CN108725440 and JP2019053377.

A skilled person will acknowledge that in the method disclosed in DE10030421, for example, the time intervals for repetition must be selected to be sufficiently small to prevent the above assumption that the movements of the first object and the second object continue unchanged from causing excessive deviations from the actual movements of those objects as well as from the actual changes in relative position of the second object to the first object. The time intervals for repetition are to be selected in dependence of the speeds of the objects and the distance between them to allow for sufficiently accurate description of an object's movement and to notice a potential change in direction.

DE102014008897 discloses a method in which the (relative) movement data of the second object is detected using a measuring device installed at the second object and transmitted to the first object (DE102014008897[0006]). Furthermore, the positional data of the second object is detected by measuring devices installed at the first object (DE102014008897; [0007]). The method disclosed in DE102014008897 is limited to observing individual trajectories (see, among others, DE102014008897; [0009]) and the prediction of trajectories. The latter is explained in particular in the description of FIG. 2 in DE102014008897; [0039]-[0042].

The time intervals for repetition may be dictated by the frame rate of the camera. Conversely, long time intervals for repetition require a high camera frame rate, which is why not every prior art camera can be employed in the above method.

In reality, a moved object does not simply follow a change in relative position calculated according to a disclosure of prior art. The movement of an object may be changed by a person's control and/or by external influences.

SUMMARY OF THE INVENTION

In exemplary embodiments of the present technology, the first object is moved into a first change in position at a first object speed and the second object is moved into a second change in relative position at a second object speed. The first object speed can have a value other than zero or it can have the value of zero. The second object speed can be zero or have a value other than zero. In any case, the first object can approach the second object, or vice versa.

In the context of the disclosure of the invention, the term 'object' may refer to a person and/or an object such as a vehicle, which object is controlled by a person.

In the context of this invention, the first object and the second object may be, for example, athletes performing a type of sport, wherein the particular type of sport performed is as such of no essential relevance in the context of the disclosure. What is essential, however, is that the athlete performing said type of sport has difficulty getting an overview of their environment. This can be among other reasons because the respective type of sport is performed at higher movement speeds of the athlete and/or because the athlete must concentrate on performing their movements.

The athlete may be a skier, for example. Skiing is usually performed at high speeds. The skier typically concentrates on performing their moves, which interact with the naturally formed slope as the subsurface, and has difficulty getting an overview of their environment. Skiing accidents involving a skier being rammed by another skier coming from behind or from further up are common.

The athlete may be a cyclist, for example. Cycling, in particular bicycle racing, is performed at high speeds. At cycling races, accidents are common during final sprints, as the cyclists concentrate on executing their movements—the sprints—and cannot get an overview of their environment because of their typical face-down posture.

A skier or cyclist typically wears a helmet when performing their sport. In prior art, a helmet may comprise displays used to relate information to the athlete. For example, known in prior art are helmets where information is displayed on the vizors as part of the helmets. The information determined while performing the method of the invention may, for example, be displayed on such a vizor.

The first object may, for example, be a truck, a cross-country vehicle, or a bus, which is controlled by a person or by a computer. The second object may be a car, a bicycle, or a motorcycle, which second object is controlled by a person. In particular when the first object is significantly larger than the second object or the design of the first object provides the person controlling the first object with a poor view of the environment, the driver of the first object may easily miss the second object.

A truck, cross-country vehicle, or bus typically has a plurality of information displays for displaying information on the condition of the object and/or on the condition of the object's environment. A truck can further include rear-view mirrors, which as information displays offer an overview of the environment and which are also suitable for displaying further information. The information determined while performing the method of the invention may be displayed on said information displays.

The first object may also be a motorcycle or the like, whereas the second object is an automobile.

The first position and thus the first change in position may be determined, for example, using GPS measuring methods. The first position and thus the first change in position may be determined using a camera. Typically, to reliably determine the change in position and/or speed and/or acceleration, two positional values are required when observing movement exclusively in one plane, or three positional values are required when observing movement in a space.

Additionally, or alternatively, to the above determination of the first changes in position, the first changes in position may be determined from the first object control data, such as telemetry data of a vehicle, or from the track routing of a railway. Methods of prior art apply in this case, which methods of prior art will not be described further in the context of the disclosure of the invention.

The above determination of the first change in position may be verified and/or supplemented by comparison with further relevant data of the first object, such as data from a navigating system.

At least one first camera with a first camera field is arranged on the first object. A skilled person will be able to orient the first camera field such that the area in which second objects move, which second objects may collide with the first object, can be recorded by the first camera field. The second relative movements of the second object to the first object are recorded using the first camera.

The camera may be arranged, for example, at an object side of the first object, which object side is neighboring with an area to be monitored using the camera. The camera may further be included in a rear-view mirror or helmet.

The relative position of the second object to the first object at a certain time may be determined using the camera and by applying methods of prior art.

The second object may also be recorded using the camera, via at least one image and/or via a video, which image or video is further processible according to the current teaching.

Methods of prior art allow determining a trajectory of an object moved in a global coordinate system to a camera not moved in a global coordinate system. The method disclosed in the following may also use said methods known in prior art, wherein the relative trajectory, or, as referred to in the context of the disclosure of the invention, the change in relative position, of a second object moved relative to a first object in a global coordinate system is determined from the image data of the first camera. Typically, to reliably determine the change in relative position and/or the relative speed and/or the relative acceleration, two positional values are required when observing movement exclusively in one plane, or three positional values are required when observing movement in a space.

In the context of the disclosure of the invention, time Tv shall be the time at which the method of the invention is performed. When performing the method of the invention over a time period, the method of the invention is executed at a plurality of times Tv within said time period.

In the context of the disclosure of the invention, time t1 . . . n and time t1 . . . m, with m and n being nonnegative integers, shall be times temporally preceding Tv. Time T1 . . . n and time T1 . . . m, with m and n being nonnegative integers, shall be times temporally following Tv. In the context of the disclosure of the invention, a small letter t is used to indicate a time preceding time Tv. A capital letter T is used to indicate a time following time Tv.

The method of the invention has the task of taking into consideration the potential movements for predicting a collision between the first object and the second object.

The method of the invention has the further, independent task of reducing requirements for the camera.

According to the invention, this is achieved by:
classifying the expired change in relative position of the second object and/or the property of the second object, wherein
the future second area of relative movement is defined taking into consideration the properties of the future change in relative position assigned by the classification of the change in relative position and the second properties of the second object assigned by the classification of the second object, respectively.

The second area of relative movement is defined in dependence of the properties of the future change in relative position assigned by the classification of the expired change in relative position and the second properties of the second object assigned by the classification of the second object, respectively.

The method of the invention may be characterized in that a similarity of the expired second change in relative position and the future second change in relative position is taken into consideration. Unlike in methods of prior art assuming that the future second change in relative position is the continuation of the expired second change in relative position, i.e., that the vector representations of the second changes in relative position run parallel, merely one similarity is presumed when performing the method of the invention. The method of the invention is thus characterized in that, unlike in methods of prior art, changes of the second change in relative position are also taken into consideration.

The method of the invention may in particular be characterized in that changes of the second changes in relative position are taken into consideration in dependence of the probability that the second changes in relative position occur. The probability of a change of the second change in relative position may be performed in dependence of the classification of the objects and/or the positions of the objects.

The method of the invention may thus be based on a second area of relative movement being defined based on a classification of the past second change in relative position of the second object, in which second area of relative movement the future change in relative position will—presumably—take place.

Based on the classification of the past change in relative movement, a future change in relative position may thus be determined with a certain probability by applying common methodologies and models. The area of relative movement may be defined as an area comprising at least those future changes in relative position which will occur with a defined probability. The skilled person may define a probability threshold value needed for this purpose, optionally taking into consideration the respective application of the method of the invention.

The past second change in relative position is compared to a database according to current teachings, in which database expired changes in relative position and future changes in relative position are deposited. A property is assigned to the future change in relative position by comparing the past change in relative position with the past changes in relative position stored in the database and optionally determining similarities. The property of the future change in relative position may be a speed property and/or a future direction of the change in relative position.

The second object is recorded with the first camera, which first camera supplies image data, wherein the second object as well as properties of the second object may be extracted according to methods of prior art. Due to the classification of the second object undertaken, unlike in methods of prior art, no high frame rate of the camera is required. Basically, a few frames are enough to determine the future change in relative position via classification of the expired change in relative position. The skilled person will acknowledge that the required number of frames depends on the accuracy required when estimating the future change in relative position and/or the possibility of classification, with sufficient accuracy, of the expired change in relative position, or, briefly, on the extent of the database.

The invention disclosed herein is thus characterized in that the high number of frames or measurement values required in methods of prior art is reduced by using a database, allowing the method of the invention to be performed in a highly efficient manner. In particular, the method of the invention is advantageous over methods of prior art in that only a fraction of recorded frames or measurement values are suitable for performing the methods of prior art or the method of the invention and in that those frames or measurement values are particularly subjected to interferences. In other words, the potential of performing the method of prior art doubtable, since the systems known in prior art are either unable to supply the required number of frames or measurement values or able to do so only at great expense.

In particular, the cameras used in motor vehicles are unable to supply a frame rate that high with sufficient quality to allow the methods of prior art to be performed. The method of the invention may be characterized in that the cameras employed in motor vehicles in prior art may be employed in performing the method of the invention, since performing the method of the invention does not require a high frame rate due to the classification of the objects.

In a testing plant, a camera from prior art is used with a frame rate of 30 frames/second. The method of the invention is characterized in that one or more cameras with a low frame rate are sufficient, since not only movements, but areas of movement comprising the potential movements are observed. Implementation of the method of the invention with a camera having a frame rate lower than 30 frames/second is also feasible.

The method of the invention is characterized in that only few frames are required for performing the method of the invention. As laid out with sufficient accuracy in the context of the disclosure of the method of the invention, only few relative positions are required to determine the expired change in relative position of the second object. The method of the invention may include a relative trajectory describing a second change in relative position of the second object to the first object being determined, but this is not necessarily required.

The method of the invention is thus characterized by an efficient handling of the measured data, such as positions, relative position, and the data derived therefrom, such as change in position, change in relative position.

Additionally, or alternatively, to the above description, the method of the invention may include that properties may be assigned to the future change in relative position based on a classification of the second object. The properties of the future change in relative position may in turn include a speed property and/or a future direction of the change in relative position.

The properties of the second object may be compared with a database in which further properties of the second object such as the size of the second area of relative movement are deposited. Methods of prior art may be applied in classifying the second object.

The second area of relative movement or the size of the second area of relative movement may, for example, be described with sufficient accuracy using an angle, as is done in the figures below.

The databases mentioned above include, for example, an angle specification of 20° for a cyclist and 1° for a car. The angle specifications given herein as examples for determining the area of relative movement take into account that a cyclist when going straight ahead usually moves in a serpentine pattern, while a car usually follows a straight line.

The database may also include that the properties of the future change in relative position are defined in dependence of the position of the first object and/or the second object. Thus, for example, the condition and/or course of the road may be taken into account.

The method of the invention may include that:

the first object is classified and the first area of movement is defined taking into consideration the first properties of the first object assigned by the classification of the first object.

The first area of movement may, for example, be described by an angle.

The first area of movement may further be defined as an area comprising those first changes in position occurring with a certain probability. The skilled person may define a probability threshold value as adequate in dependence of a particular application of the method of the invention.

The skilled person may define the first area of movement by suitable geometrical specifications based on their experience.

As specified above, the camera is mounted on the first object. The camera supplies image data, which is the basis for the method of the invention. Among other things, it is an aim of the method to warn the person driving, for example, the first object regarding a collision with the second object. Since the properties of the first object remain essentially unchanged, it is most useful to define the properties of the first object necessary for performing the method of the invention via one-time input. Accordingly, the first area of movement may be defined via one-time input.

The solution demonstrated herein is characterized in that the first area of movement and/or the second area of relative movement may be object-specific parameters, which parameters are included in the method of the invention.

The first area of movement and/or the second area of relative movement may also include or take into consideration environment-specific parameters, which parameters are included in the method of the invention. The environment surrounding the first object may be recorded using the first camera, wherein the camera records the environment surrounding the second object as well. The environment, such as road conditions like bumps, sewer covers, et cetera, the course of the road like an intersection, a narrowing, a curve, et cetera, may be classified.

The first area of movement and/or the second area of relative movement may be defined with sufficient accuracy using an angle specification or other geometrical factor. The definition of the angle specification may be done in an object-specific manner based on a classification performed on the object, wherein the angle specification is increased or decreased taking into consideration the classification of the environment.

The environment-specific parameters may include a probability specification regarding the future first change in position and/or the future second change in relative position. The first area of movement and/or the second area of relative movement may in turn be an area comprising the relevant movements occurring with a certain probability.

The method of the invention under discussion may likewise be executed as a computer-implemented method, like known methods. Computer-implemented methods in particular may be subject to latency, which latency is due, among other things, to the devices employed. The method of the invention may include methods of prior art by which the latency is determined, and a notification is issued when a threshold value is exceeded.

The method of the invention may likewise, like the known methods, include the issuing of a signal when a second object is detected, which second object is moved and is moved relative to the first object.

The method of the invention may provide that an alarm signal is issued within an adequate alert period prior to the calculated collision of the first object and the second object, like an overlap of the first future change in position and the future second change in relative position. The skilled person is able to define the alert period depending on the speeds of the objects, the typical response time of a person, et cetera. The skilled person may further take into consideration a latency of a device for performing the method of the invention when choosing the alert period.

In addition to the definition of the area of movement and the area of relative movement, respectively, depending on the classification of the expired change in relative position and/or the classification of the objects, the method of the invention may also be characterized in that an alarm with different alarm stages is issued depending on the probability of occurrence of the calculated collision and the time until it occurs.

Changes in relative position intended by the person driving the object are possible, which possible changes in relative position are included in the method of the invention as a range of potential changes in relative position intended by said person. The skilled person will acknowledge that such changes in relative position intended by the person essentially depend on the type of object and thus become well-detectable by determining at least one property of the object, as will be discussed below.

Further, changes in relative position influenced by the subsurface are possible, which potential changes in relative position are included in the method of the invention as changes in relative position influenced by the subsurface. The skilled person will acknowledge that such changes in relative position depend on the type and nature of the subsurface on which the object is moved, which is well-detectable when performing the method of the invention by detecting at least one property of the object and/or one property of the subsurface. The properties of the object and/or the property of the subsurface may be detected using the camera.

An alarm signal may be issued when a future second change in relative position and a future first change in position overlap at a collision time Tk.

An alarm signal may also be issued when the second area of movement and the future first change in movement overlap at a collision time Tk.

An alarm signal may also be issued when the first area of movement and the second area of relative movement overlap at a collision time Tk.

It will be obvious to the skilled person that an alarm signal is issued when the future first change in position and the future second area of relative movement overlap at a collision time Tk. An alarm signal may also be issued when the future second change in relative position and the future first area of movement overlap at a collision time Tk.

The method of the invention may be characterized in that the first object has a first area of movement at time Tv, wherein the first area of movement takes into consideration the changes in position possible with a defined probability at time Tv, and an alarm signal is optionally issued when the first area of movement and the second change in relative position optionally overlap taking into consideration an area certainty factor.

Analogously, the method of the invention may comprise that the second object has a second area of relative movement at time Tv, wherein the second area of relative movement takes into consideration the changes in relative position of the second object to the first object possible with a defined probability at time Tv, and an alarm signal is optionally issued when the second area of movement and the first area of movement, or the first change in relative position, respectively, optionally overlap taking into consideration an area certainty factor.

The method of the invention may be characterized in that:
the classification of the first object is by input data.

When the first object moves in a usual environment, the first object usually encounters a definable group of second objects with a definable variance of second properties. The second objects of the group of second objects may vary by certain properties, which properties are advantageously the selected properties in the classification of the second object.

The method of the invention may further be characterized in that:

the classification of the second object is by selected second properties.

The skilled person may select a second group of second properties to efficiently perform the method of the invention, by which second properties the image data created using the first camera when detecting an object to be identified as a second object and to classify said second object is verified. The image data may be analyzed using a group of filters of neural networks that are not further disclosed herein. The method of the invention may provide that certain priorities be assigned to the applicable filters from the group of possible filters. Via defining the priorities, individual filters having different significances may be set to the classification results active or inactive.

Assigning priority factors to the respective filters is done in dependence of the situation expected. Certain situations usually occur at certain places; hence the method of the invention may provide that the assigning of priorities to the filters be in dependence of the position of the first object determinable via GPS methods.

The method of the invention may verify the image data to check whether an object to be detected in the image data as a second object has an object speed and object change in relative position, which object speed is different from the first object speed of the first object and which object change in relative position is directed to the first object change in relative position. This limits the analysis of the image data in that only moved objects are regarded as second objects.

According to the above description, the method of the invention is based on the past change in relative position having taken place at times t1 . . . tn being determined at a time Tv and a future change in relative position to take place at a time T1 . . . N being determined therefrom under the assumption of a similarity of the past change in relative position and the future change in relative position and taking into consideration ranges. When taking into consideration ranges, areas of movement may be determined.

The method of the invention may also include the step that the future second change in relative position determined and/or the future second area of relative movement are verified to check whether the future second change in relative position determined has occurred and/or the future second area of relative movement determined includes the actual movement.

The method of the invention may include that the change in position and/or change in relative position and/or area of movement and/or area of relative movement determined at time Tv is compared with a change in relative position actually measured at a time Tv+1 subsequent to time Tv.

To do so, the method of the invention may include that the future changes in relative position calculated at a time Tv are compared to the changes in relative position determined at a time T+1 and/or the future relative positions of the second object calculated at a time Tv are compared with the relative positions of the second object determined at a time Tv+1.

The method of the invention may include that the change in position and/or change in relative position determined at time Tv+1 is stored in the database, optionally along with a classification of the object. This data comprising the change in position and/or change in relative position optionally along with a classification of the object may be supplemented with a specified location. The method of the invention may thus be characterized in that the database by which the classifications described above are performed is permanently expanded.

The changes in relative position determined and the changes in position calculated as well as, optionally, the class affiliation of the second object may be stored in a database.

The method of the invention may include self-learning routines. For example, according to the teaching of artificial intelligence, properties may be ascribed based on the determined data from image data, positions, changes in position, et cetera, which properties may be used with reference to the above discussion of the method of the invention to estimate the future second changes in relative position and/or the future areas of movement with sufficient accuracy and optionally with an accuracy that increases with the number of repetitions of the method of the invention.

The first positions of the first object may be determined using GPS.

The method of the invention may be characterized in that the first object comprises a screen for displaying an image generated by the first camera, on which screen the second object is represented magnified or with a mark in the case of an alarm signal.

The magnified representation of the second object in the case of an alarm signal may also include that a camera recording the second object is selected from a plurality of cameras.

A distance between the future first position of the first object and the future relative position of the second object may also be determined, and the second object may be represented on the screen magnified or with a mark depending on said distance.

BRIEF DESCRIPTION OF THE DRAWINGS

In addition to the above description, he method of the invention will be discussed with reference to the following potential embodiments. The potential embodiments are illustrated in the figures below. The skilled person is able to read together the embodiments described in the following with reference to the figures among each other or any embodiment with the above description.

DETAILED DESCRIPTION

The embodiments shown in the figures merely show potential embodiments, while it should be noted at this point that the invention is not limited to such specially illustrated variant embodiments thereof, but that combinations of the individual variant embodiments among each other and a combination of an embodiment with the general description given above are possible. Such further possible combinations need not be explicitly mentioned, since said further possible combinations are within the skill of the art of those in the respective technical field based on the technical teaching.

The scope of the invention is defined by the claims. The description and the drawings, however, are to be consulted in interpreting the claims. Individual features or combinations of features from the different embodiments shown and described may constitute independent inventive solutions in themselves. The task underlying the independent inventive solutions may be learned from the description.

Figure 1:
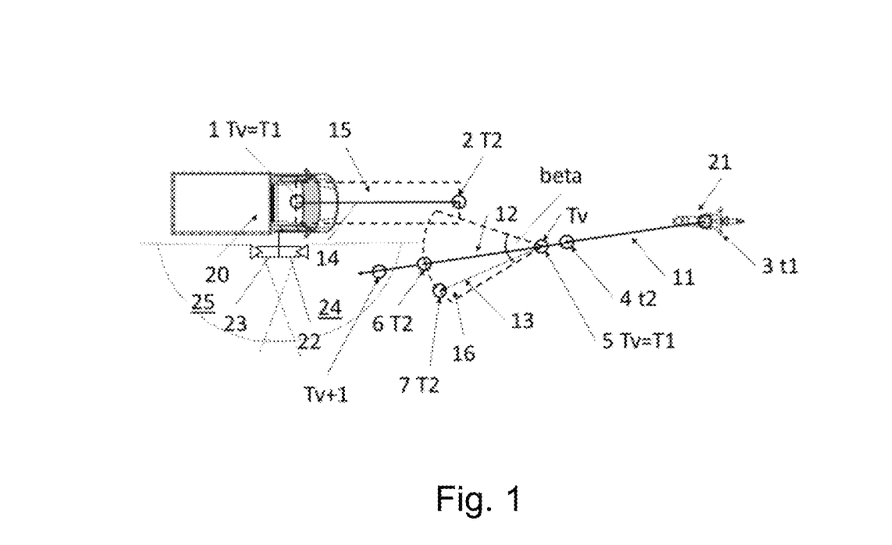
FIG. 1 shows a potential embodiment of the method of the invention, which embodiment is applied when determining the relative positions of two bicycles.

In the figures, the following elements are each designated by the preceding reference numerals, respectively:
1 measured position of first object Tv=T1
2 calculated position of first object T2
3 measured relative position of second object t1
4 measured relative position of second object t2
5 calculated relative position of second object Tv=T1
6 calculated relative position of second object T2
7 measured relative position second object T2
8 measured position first object t=1
9 measured position first object t=2
10 expired change in relative position (t1→t2) of the first object
11 expired change in relative position (t1→t2) of the second object
12 future calculated change in relative position (T1→T2) of the second object
13 determined actual change in relative position (T1→T2) of the second object
14 future direction of movement (T1→T2) of the first object
15 first area of movement of first object T1→T2
16 second area of movement of second object T1→T2
17 surrounding area
18 surrounding distance
19 (blank)
20 first object
21 second object
22 forward camera
23 backward camera
24 first camera field of first camera
25 second camera field of second camera
Tk collision time
Tv time of performing method of the invention
t1 . . . n expired times
T1 . . . n future times FIG. 1 illustrates a potential embodiment of the method of the invention of displaying and/or calculating a relative movement of a second moved object 2, 3, 4, 5, 6 to a first moved object 1.

The first object 20 is a truck, which is moved by a person residing inside the truck into a first change in position 15 from a position 1 at a time Tv=T1 to a position 2 at a time T2.

The second object 21 is a bicycle, which is moved by a further person residing on the bicycle into a second change in relative position from position 3 to positions 4 to 6.

The first object 20 comprises a camera assembly with a camera field. The camera assembly comprises a forward camera 22 with a first camera field 24 and a backward camera 23 with a second camera field. The first camera may, for example, be arranged on the truck. The exact arrangement of the first camera on the first object 20 is without influence in the context of the discussion of this embodiment, if the first camera is arranged such that the second object 21 is recordable with the first camera and the relative position of the second object 21 to the first object 20 is determinable at at least two times t1 . . . tn with the first camera.

The device for processing data for performing the method of the invention is arranged in the first object 20. Classification of the first object 20 is by input data.

The first object 20 usually approaches the second object 21 from behind, which implies that the first object 20 is moved at a first speed higher than the second speed of the second object. The further person as part of the second object 21 cannot or can only poorly observe the approaching first object 20.

In the context of the discussion, Tv shall be the time at which the method of the invention is performed. The first object 20 may be moved as seen in the global coordinate system or stationary at the first position 1 at time Tv. The second object 21 may be moved relative to the first object 20 or also stand still at time Tv.

FIG. 1 reflects typical situations in real life. It is a typical situation that a truck as a first object approaches a moved or stationary single-track vehicle as a second object. Furthermore, the single-track vehicle as the second object may pass the stationary or slowly moved truck sideways. The situation may in any case be such that the single-track vehicle may easily be missed by the person driving the truck. The person driving the truck may steer the truck as the first object 20 such that the truck as the first object 20 collides with the single-track vehicle as the second object 21. The invention disclosed herein has the object to prevent collision of the first object 20 with the second object 21.

FIG. 1 comprises a circular mark at position 1, in which position 1 the first object 20 is located at time Tv, wherein time Tv illustrated in FIG. 1 equals time T1. The first object 20 is moved along the first change in position 14 to position 2 at a time T2. It is assumed that the first change in position 14 is determinable with sufficient accuracy via object data such as vehicle data, telemetry data of the truck. The first change in position 14 is alternatively or additionally also determinable using GPS methods.

Furthermore, the circular mark designates position 5, in which position 5 the second object 21 is located at time Tv, wherein time TV equals time T1. Times t1 and t2 are defined as times prior to Tv. The positions 2, 3 at time t1 and t2, respectively, thus relate to past positions of the expired change in relative position 11 of the second object 21. Times T1 and T2 relate to future times as compared to time Tv. The positions 5, 6 in question at times T1 and T2, respectively, relate to a future change in relative position 12 of the second object 21 as compared to time Tv.

A temporally expired change in relative position 11 of the relative positions 2, 3 of the second object 21 at time Tv is thus determinable at time Tv. The change in relative position 11 expired at time Tv is the difference between the relative position 2 of the second object 21 at a time t1 and the relative position 3 of the second object 21 at a time t2. Relative position 2 and relative position 3 are specifiable with sufficient accuracy using coordinates, which coordinates are determinable by applying Methods of prior art using the first camera.

The method of the invention may be characterized in that both the coordinates in the plane of the first camera and global coordinates can be used. It should be added that, to determine the global coordinates, the global coordinates of the first object and, therefrom, the global coordinates of the second object are determinable by Methods of prior art. The global coordinates of the first object may be determined by applying a GPS system.

The expired change in relative position 11 is calculatable from the change in position from position 3 to position 4. In the exemplary embodiment shown in FIG. 1, only the expired positions 3, 4 are known at time TV, so that the matter of selecting the time span prior to Tv does not apply for the exemplary embodiment discussed herein.

The method of the invention is based on the assumption that following time Tv, the second object 21 moves in a way similar to the way the second object 21 moved prior to time Tv. The assumption of similar movement concerns similar speed and a similar relative direction. For this reason, the future change in relative position 12 of the second object 21, which future change in relative position 12 is from position 5 at time T1 to position 6 at time T2, equals the expired second change in relative position 11, wherein the progressing movement of the second object 21 should be noted. As can be seen from FIG. 1, position 5 at time Tv equals the position at time T1, as the future change in relative position 12 to position 6 occurs at time T2.

The method of the invention may comprise a comparison of the first change in relative position 15 of the first object with the future change in relative position 12. An alarm signal is issued in the first object 20 when the future change in relative position 12 and a first change in position 15 overlap at a collision time Tk. FIG. 1 shows that the first change in relative position 15 and future change in relative position 12 have no intersection at any collision time Tk, which is why no alarm signal is issued based on the overlap of the first change in relative position 15 and the change in relative position 12.

However, it does not reflect reality objects exclusively move in unchanged directions. A change in direction of an object as that of a bicycle as the second object 21 by way of example in FIG. 1 may be unpredictable and fast.

The second object 21 may change its second change in relative position at and/or after time Tv. A second area of relative movement 16 is defined for the second object 21 at time Tv, which area of relative movement 16 takes into consideration such potential changes in direction of the second change in relative position 12 while taking into consideration the probability of the occurrence of the changes in direction. Furthermore, the width of the bicycle as the second object 21 is also taken into consideration by the second area of relative movement 16 in addition to a potential second change in relative position.

The method of the invention may be characterized in that the past second change in relative position 11 is classified by applying methods according to the current teaching. The expired second change in relative position 11 determined is compared with second reference changes in relative position stored in a database and a second area of relative movement 16 is determined based on the similarity of the expired reference second changes in relative position 11 and at least one reference second change in relative position. The skilled person will understand that a second reference area of relative movement is stored in the database at least for each reference change in relative position, wherein at least one reference area of relative movement is determined from a plurality of stored reference areas of relative movement based on a similarity between the reference change in relative position and the expired second change in relative position.

The method of the invention may also be characterized in that the second object 21 is classified. The image data of the second object 21 are compared with reference image data of reference second objects stored in the database and a second area of relative movement 16 is assigned to the classified second object 21 based on a similarity between the second object 21 and the reference second object, which second area of relative movement 16 is deposited in the database with the reference second object.

In the exemplary embodiment shown in FIG. 1, the second area of relative movement 16 describable with sufficient accuracy by an angle beta is assigned to the expired second change in relative position 11 and the second object 21, respectively. The angle beta may be 20° in the exemplary embodiment shown in FIG. 1, in which the second object 21 is a bicycle. Alternatively or additionally to the definition via the angle beta, the second area of relative movement 11 may also be defined as an area comprising the future second relative movements 12 with a predefined probability.

The first object 20 may change its first change in position 14 at and/or after time Tv. A first area of movement 15 is defined to take into consideration the potential first changes in position 14, wherein potential first changes in position 14 are taken into consideration with a predefined probability. In the exemplary embodiment shown in FIG. 1, it is assumed that the truck as the first object 1 undertakes essentially no change in direction. The first area of movement 15 is defined such that the width of the first object 1 is taken into consideration by the first area of movement in addition to a potential change in position negligible herein.

The first area of movement 15 and the second area of movement 16 to take into consideration the potential changes in position may be defined based on statistic values stored in the database or reference movement profiles stored in the database. The first area of movement 15 and the second area of movement 16 to take into consideration the widths of the first object 20 and the second object 21, respectively, are defined with reference to the properties of the respective objects 20, 21.

The first area of movement 15 may thus be the sum of the potential first changes in position 14 and the width of the first object 20. The second area of movement 16 may thus be constituted by the sum of the potential second changes in relative position 12 and the width of the second object 21.

The areas of movement 15, 16 are compared to increase certainty. FIG. 1 shows that the areas of movement 15, 16 overlap, which areas of movement 15, 16 take into consideration the potential changes in relative position of the first object 20 and the second object 21 with a predefined probability, making a collision of the objects 20, 21 possible. An alarm signal is thus issued. To increase certainty, the areas of movement 15, 16 may be extended, which is not shown in FIG. 1 for the sake of clarity.

The future changes in relative position 12 from position 5 to position 6 determined at a time Tv are expired by a time Tv+1 and thus actual changes in relative position 13 from position 5 to position 7, with time Tv+1 succeeding time Tv. The method of the invention includes that the actual changes in relative position 13 are determined at time Tv+1 and compared with the changes in relative position 12 calculated at time Tv. The difference between the changes in relative position 12 and the changes in relative position 13 is then stored in a database.

The GPS data of the first object 20 may be determined and stored in the database.

Furthermore, a potential camera assembly is included in FIG. 1. In the other figures, the camera assembly is not included for the sake of clarity.

The camera assembly comprises a forward camera 22 and a backward camera 23. The first camera 22 is oriented against the direction of movement 15 of the first object 20, while the second camera 23 is directed in the direction of movement 15 of the first object 20. The first camera field 24 of the first camera 22 and the second camera field 25 of the second camera 23 cover the entire area to the side of the first object 20. The arrangement of cameras 22, 23 with overlapping camera fields 24, 25 is included in FIG. 1 by way of example.

The truck as the first object 20 may comprise a screen, on which screen the second object 21 recordable using the forward camera 22 and/or using the backward camera 23 may be displayed. The display of the second object 21 on the screen may be such that the second object 21 may be represented magnified and/or provided with a mark in dependence of a possible collision between the first object 20 and the second object 21, in particular in dependence of the probability of such a collision. The display of the second object 21 on the screen and/or the magnification of the display of the second object 21 and/or the mark with the second object 21 on the screen may also be in dependence of the distance between the first object 20 and the second object 21.

Figure 2:
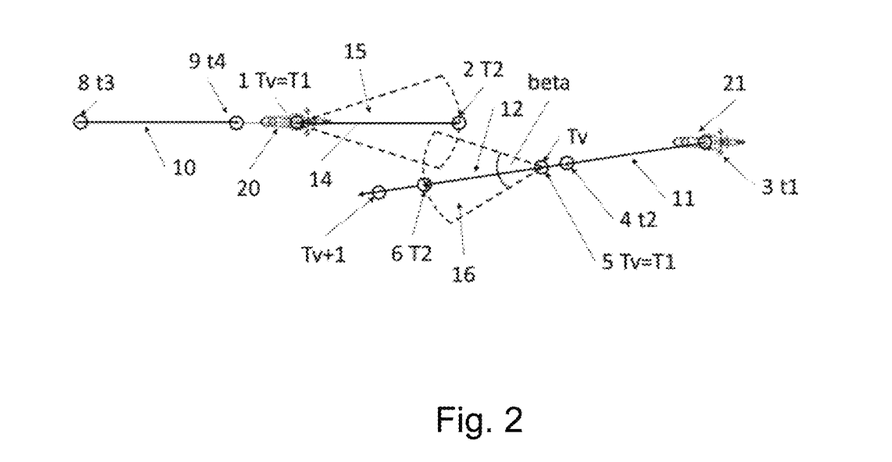
FIG. 2 shows a further potential embodiment of the method of the invention, which embodiment is applied when determining the relative positions of a truck and a bicycle.

FIG. 2 illustrates a further embodiment of the method of the invention, which further embodiment is similar to the embodiment shown in FIG. 1. The embodiment shown in FIG. 1 is different from the embodiment shown in FIG. 2 in the determination of the first change in position of the first object.

A first position 8 of the first object 1 is determined at a time t3. Furthermore, a first position 9 of the first object is determined at a time t4. The determination of the position takes place by applying GPS technologies from prior art. An expired first change in position 10 is determined from the first position 8 and the second position 9, from which expired first change in position 10 a future first change in position 14 beginning at time T1=Tv is determinable. From this, the future first position 2 at time T2 is also determinable.

In the exemplary embodiment shown in FIG. 2, a possible collision of two bicycles as two objects 20, 21 is observed. A first area of movement 15 and a second area of relative movement 16 is assigned to the movement of the two objects 20, 21, respectively. The area of movement 15 and the second area of relative movement 16 are generated based on a classification of the first object 20 and the second object 21, respectively.

Classification of the first object 20 may be by input data. The input data may, for example, relate that the first object 20 is a bicycle. A first area of movement 15 is deposited in a database, which first area of movement 15 is characteristic for the object 20 classified.

Alternatively, or additionally, the determinable first change in position 10 may be classified. The determinable first change in position 10 is thus compared with at least one first reference change in position, which first reference change in position is stored in a database. A first area of reference movement as the first area of movement 15 is assigned to the first change in position 10 and the first object 20, respectively. The skilled person will see that an essentially more accurate estimation of a future first change in position 14 becomes possible by classifying the first change in position 10. Accordingly, the first area of movement 15 may be determined with more accuracy, allowing mistakes in the estimation of a possible collision to be avoided.

The first object 20 comprises a camera (not included in FIG. 2), using which the second object 21 may be recorded. The camera generates image data, using which the second object 21 may be classified by applying the current teaching.

The second object 21 may be compared with at least one reference second object deposited in a database, to which reference second object a reference second area of movement is assigned. A reference second area of movement is assigned to the second area of relative movement based on an analysis of similarities between the second object 21 and the reference second object. Like in the case of an exclusive classification of the first object, said assigning is exclusively based on the properties of the second object 21, i.e., properties of the reference second object stored in the database.

The invention has the object of taking into consideration the current properties of the second object, i.e., the properties determinable between time t1 and time Tv.

Position 3 of the second object 21 at time t1 and position 5 of the second object 21 at time t2 are determinable from the image data by applying the current teaching. The second expired change in relative position 11 is also determinable and classifiable by applying the current teaching, in which the second expired change in relative position 11 is compared with at least one reference second change in relative position. A reference second area of movement is deposited in a database with a reference second change in relative position. A reference second area of movement is assigned to the second area of movement 16 by determining a degree of similarity between the expired second change in relative position and the reference second changes in relative position, thereby determining the size of the second area of relative movement 16. Defining the size of the second area of relative movement 16 may usually be via defining an angle beta, as it may be assumed that the difference in speed between the first object 20 and the second object 21 does not abruptly change. The skilled person may also define other parameters as set out above to define the size of the second area of movement 16.

In FIG. 2, the second area of movement 16 has the shape of a segment, as it is assumed that the difference in speed between the first object 20 and the second object 21 over the time span T1-T2 and that over the time span t1-t2 are similar. Other shapes are also possible, which other shapes take into account a change in the difference in speed, for example.

Analysis of the area of movement 15 and the second area of relative movement 16 reveals that while the first area of movement 15 and the second area of relative movement 16 intersect, the first change in position 14 and the second change in relative position 12 do not share an intersection. Unlike methods of prior art, the method of the invention delivers a collision warning, while the methods of prior art would not determine a risk of collision. The collision warning determined by the method of the invention is compliant with the concept of safety.

Figure 3:
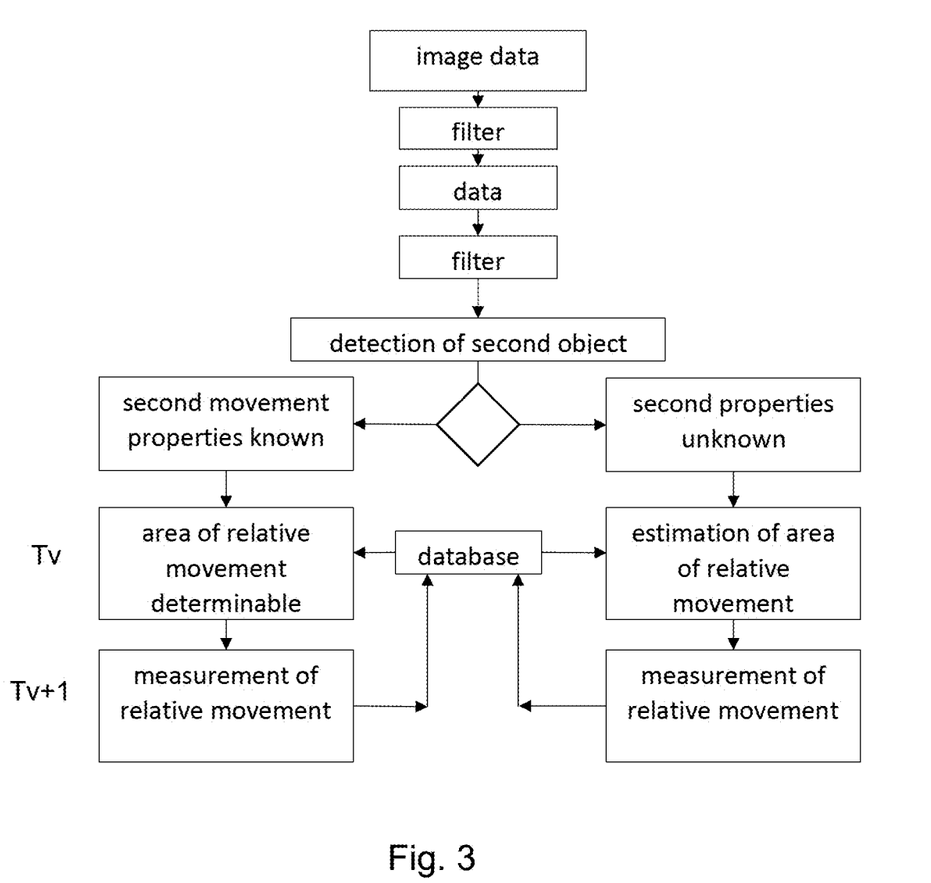
FIG. 3 illustrates the flowchart when identifying a second object while applying the method of the invention.

FIG. 3 illustrates schematically the data processing process as part of the method of the invention. Said data processing process may also take place independent of the displaying and/or calculating of a relative movement of a second object to a first object.

The image data is recorded via the first camera. The first camera is attached to the first object in such a manner that the second object moved relative to the first object is recorded by the camera. The second object 2 may by extracted from image data generated using the camera by applying methods of prior art.

The method of the invention is characterized in that properties selected from the image data are used to detect the second object.

Application of the method of the invention to detect relative movement of a second athlete to a first athlete is discussed in the introduction to the description, where the example of skiers and the example of cyclists are given.

When performing their sport, athletes typically wear helmets. A helmet has a shape like a sphere. Based on these selected geometrical properties, the helmet and thus the second athlete are well distinguishable from the other objects.

It is indicated in FIG. 3 that data is generated from the image data using at least one filter by applying the teaching of neural networks, which data is interpreted as an indication of a second object while stating a probability. Such neural networks are known in prior art and may be applied to perform the method of the invention according to the general part above and according to the embodiments given by way of example.

The method of the invention may include that the application of the at least one filter is provided with a priority factor in each case. The data acquired by applying the respective filter is weighted as a result by the at least one priority factor. The method of the invention may be characterized in that, for certain applications, a predefined priority factor is in each case assigned to the at least one filter, which priority factor takes into consideration the particular properties of the second object to be detected. Said assignment of predefined priority factors may include that a filter is assigned the priority zero and the filter thus produces no change of the data set.

The predefined priority factors are predefined in learning processes.

Application of the method of the invention to detect relative movement of a cyclist as a second object to a truck as a first object is discussed in the introduction to the description.

In the environment of the first object, there are unmoved further objects next to the moved second object. Unlike the second object, the further objects have a further relative speed to the first object, which further relative speed equals the value of the first speed of the first object measured in the global coordinate system. The second relative speed of the second object is different from the value of the first speed of the first object measured in the global coordinate system. The second speed of the second object may thus by a selected property of the second object.

As indicated in FIG. 3, a detected object is classified when performing the method of the invention. In said classification, it is detected whether the classified object is, for example, a tree, part of a building, or a person, a bicycle. It is further deposited in the database whether the object detected and classified is moved or moves, which is a basis for the decision as to further observing the detected object as a second object when performing the method of the invention. The method of the invention is primarily designed for observing moved objects as second objects, which is why detected an non-moving or unmoved objects cannot be considered any further.

Classification of the second object may result in the second object being detected as a bicycle, a skier, et cetera, and thus the second movement properties being known.

When the second movement properties are known, the second area of relative movement may be established with accuracy in dependence of the available data. In FIG. 3, this is set out with the block 'area of relative movement determinable'. The second movement properties stored in the database include second specifications on the potential changes of direction of the second object. Said second specifications include an angle specification as a value describing the extent of the change in direction in dependence of the dynamic value, including (but not limited to) speed, acceleration, and/or properties of the classified object, including (but not limited to) size, volume of the classified object, and/or the probability of the change in direction, and/or the local conditions, including (but not limited to) course of the road, property of subsurface. The second area of relative movement is calculatable based on the second specifications. In FIG. 1 and FIG. 2, the extent of the potential change in direction is indicated by the angle beta. The area of movement is determined at time Tv.

The description of FIG. 1 and FIG. 2 mentions that the change in relative position of the second object between times T1, T2 is measured with known movement properties at a time Tv+1. While the data is read from the database when calculating the second area of movement at time Tv, the data is stored in the database after the measurement at time Tv+1.

Classification of the second object may also result in the second object not being detected and a similar second object or group of similar second objects being determined for the second object. A second area of relative movement may be estimated based on the second properties assigned to the similar second object or based on the properties assigned to the group of similar second objects.

In analogy with the above description, the method includes the step of determining the actual relative movement of the unclassifiable second object at a time TV+1 and depositing said actual relative movement in the database while linking it to the unclassifiable second object.

Figure 4:
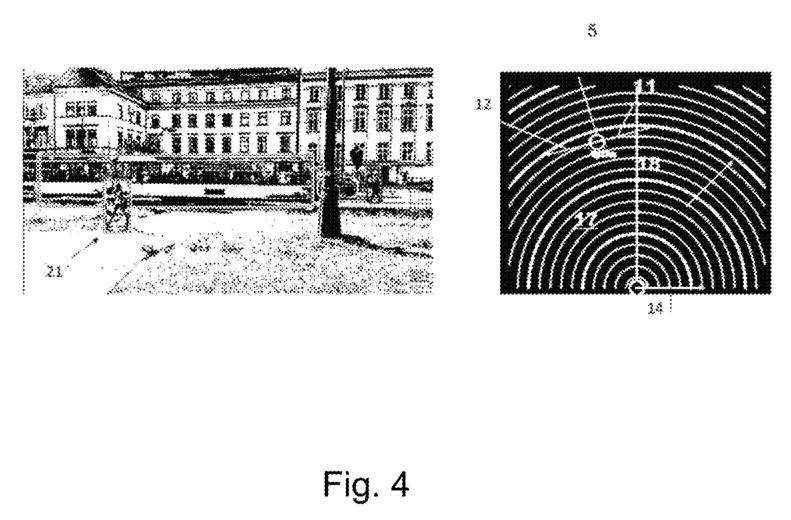
FIG. 4 shows a further application of the method of the invention.

FIG. 4 shows a further application of the method of the invention. FIG. 4 includes, on the left, an image, which is recorded using a first camera. In this exemplary embodiment, the first camera is arranged on the side of a tram in such a manner that a side space around the tram is recorded. It is the aim of said camera arrangement to monitor the side space for second objects which cross the movement of the tram as the first object and may collide with the tram as the first object.

The image on the left in FIG. 4 includes a further tram marked as a second object. The further tram is not considered any further as the further tram is sufficiently far away from the tram as the first object. The method of the invention may thus include predefining an area of observation, in which objects as second objects are observed.

The image on the left in FIG. 4 includes a person 21 marked as a second object. The method of the invention predefines an environment area as an area with an observational distance to the first object. Objects detected as second objects in this area of observation may collide with the first object.

FIG. 4 includes an image on the right, in which image on the right the relative position 5 of the second object 21 as well as the changes in relative position 11, 12 of the second object 21 are included. The image on the right in FIG. 4 is the result of the analysis of image data of the image on the left, wherein various times are observed to determine the directions of movement. It becomes clear from the image on the right in FIG. 4 that no collision between the person as the second object 21 and the tram as the first object is happening.

Figure 5:
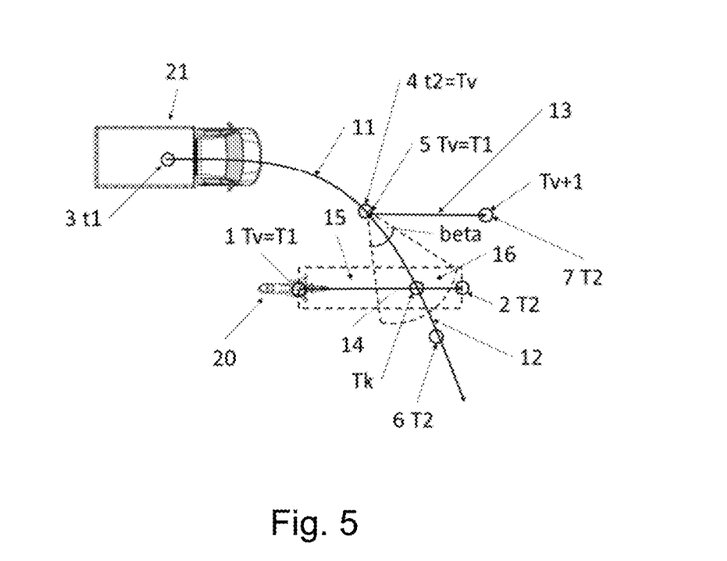
FIG. 5 shows a further application of the method of the invention.

FIG. 5 shows a further way of applying the method of the invention. It is to be examined whether a collision between a single-track vehicle such as a motorbike, for example, as the first object 20 and a truck as the second object 21 takes place. This application example is very similar to the application examples discussed based on FIG. 1 and FIG. 2.

The second object 21 approaches the first object 20 from behind. The first change in position 14 and, optionally via classification as described above, the first area of movement 15 are determined from the telemetry data of the first object 20. A future change in relative position 12 and an area of relative movement 15 are thus determined from the temporally expired change in relative position 11. In analogy with the above description, the future second change in relative position 12 and the second area of movement are determined.

The method of the invention detects that the first change in position 14 and the second change in relative position 12 have a common intersection Tk and the first area of movement 15 and the second area of relative movement 16 have an overlap area. The method of the invention delivers the result of the immanent potential collision at time Tv and issues an alarm to the person residing on the first object 20, who can then warn the driver of the truck as the second object 21 by honking their horn.

The driver of the truck as the second object changes direction at time Tv. The first object does not follow the change in relative direction 12 determined but the actual change in relative position 13, which is actually determinable at time Tv+1. The method of the invention may include routines for documenting in the database that the issuing of an alarm has led to a change in direction of the second object.

Figure 6:
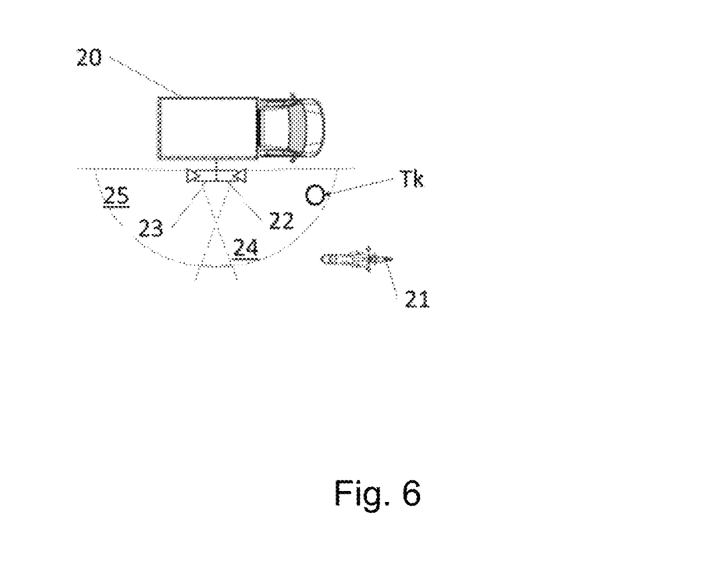
FIG. 6 shows a further embodiment of the method of the invention.

FIG. 6 shows a further embodiment of the method of the invention. A first object 20 and a second object 21 are shown in FIG. 6, wherein a collision is determined by applying the method described above. For the sake of clarity, the changes in position, changes in relative position, areas of movement are not shown in FIG. 6. The place of collision is included in FIG. 6 by way of example and marked Tk.

The first object 20 includes a camera assembly having a forward camera 22 and a backward camera 23. The forward camera 22 includes a first camera field 24 and the backward camera includes a second camera field 25. The relative position of the second object 21 to the first object is determinable from the image data, which are determined using the camera assembly. The place of collision at a collision time Tk is determinable by applying the method described above.

The place of collision may be compared with the camera fields 24, 25. This is feasible for the skilled person by observing the coordinates, which, in the exemplary embodiment shown in FIG. 6, delivers the result that the place of collision Tk is in the first camera field 24. The method may include that camera being selected which records the second object and/or which records a potential future place of collision Tk, in this case the forward camera 22.

The first camera field 25 does not record part of the first object 20. It is therefore possible that the driver of the first object 20 has poor orientation. This may in particular be the case when the second object 20 and/or the place of collision is/are shown magnified on a screen. For better orientation of the driver of the first object 20, the first camera field 24 may be changed by turning the forward camera 22 in such a manner that parts of the first object 20 are shown on the screen in addition to the place of collision Tk and/or the second object 21.

The invention claimed is:

1. A method for at least one of displaying and calculating relative movement of a second moved object to a first moved object, the method being performable at a time Tv, the method comprising:

moving the first object into a first change in position;
moving the second object into a second relative change in position; and
arranging at least one first camera with a first camera field on the first object, the at least one first camera configured to determine a relative position of the second object to the first object, the second object being located in the first camera field;
wherein, at time Tv, a temporally expired second change in relative position of the second object from a relative position at a time tl to a relative position at a time tl+1 is determinable, which temporally expired second change in relative position is determinable as a difference between a second relative position at a time tl and a second relative position at a time tl+1, from which expired second change in relative position a future second change in relative position of the second object from a second relative position at a time T1 to a future second relative position at a time Tn is calculated;
wherein times T1 . . . TN at time Tv and at times t1 . . . n as well as t1 . . . m are temporally successive, which future first change in position is compared with the future second change in relative position at times T1 . . . TN;
wherein a similarity of the expired second change in relative position and the future second change in relative position is taken into consideration by a second area of relative movement in that at least one of the change in relative position of the second object and the property of the second object is classified; and
wherein the second area of relative movement is defined taking into consideration the properties of the future change in relative position assigned by the classification of the change in relative position and the second properties of the second object assigned by the classification of the second object, respectively.

2. The method as claimed in claim 1, wherein the method is additionally configured to prevent a collision between the first moved object and the second moved object.

3. The method as claimed in claim 1, wherein, at time Tv, a temporally expired first change in position of the first object from a first position of the first object at a time tm to a further first position of the first object at a time tm+1 is determinable, which temporally expired first change in position is determinable as a difference between a first relative position at a time tm and at least one of:
a first relative position at a time tm+1;
from first object control data; and
from GPS data;
from which expired first change in position a future first change in position of the first object from a first position at a time T1 to a future first position at a time Tn is calculated.

4. The method as claimed in claim 1, wherein:
the similarity of the first change in relative position and the first change in relative position is taken into consideration by a first area of movement; and
the first object is classified and the first area of movement is defined taking into consideration the first properties of the first object assigned by the classification of the first object.

5. The method as claimed in claim 1, wherein at least one of
an alarm signal is issued when a future second change in relative position and a future first change in position overlap at a collision time Tk;
the alarm signal is issued when the second area of movement and the future first change in movement overlap at a collision time Tk; and the alarm signal is issued when the first area of movement and the second area of relative movement overlap at a collision time Tk.

6. The method as claimed in claim 2, wherein the classification of the first object is by input data.

7. The method as claimed in claim 1, wherein the classification of the second object is by selected second properties.

8. The method as claimed in claim 1, wherein
at least on of:
the future changes in relative position calculated at a time Tv are compared with the changes in relative position calculated at a time Tv+1; and
the future changes in relative position of the second object calculated at a time Tv are compared with the changes in relative position of the second object calculated at a time Tv+1; and
the relative changes in position determined and the changes in position calculated are stored in a database.

9. The method as claimed in claim 8, wherein the class affiliations of the first object and the second object are stored in a database.

10. The method as claimed in claim 1, further comprising determining the GPS data of the first object.

11. The method as claimed in claim 5, wherein the second object is displayed one of magnified and with a mark on a screen in a case of an alarm signal.

12. The method as claimed in claim 1, wherein a distance between the future first position of the first object and the future relative position of the second object is determined and the second object is displayed one of magnified and with a mark on the screen in dependence of said distance.

13. A device for processing data, comprising a computer for performing a method for at least one of displaying and calculating relative movement of a second moved object to a first moved object, the method being performable at a time Tv, the method comprising:
moving the first object into a first change in position;
moving the second object into a second relative change in position; and
arranging at least one first camera with a first camera field on the first object, the at least one first camera configured to determine a relative position of the second object to the first object, the second object being located in the first camera field;
wherein, at time Tv, a temporally expired second change in relative position of the second object from a relative position at a time tl to a relative position at a time tl+1 is determinable, which temporally expired second change in relative position is determinable as a difference between a second relative position at a time tl and a second relative position at a time tl+1, from which expired second change in relative position a future second change in relative position of the second object from a second relative position at a time T1 to a future second relative position at a time Tn is calculated;
wherein times T1 . . . TN at time Tv and at times t1 . . . n as well as t1 . . . m are temporally successive, which future first change in position is compared with the future second change in relative position at times T1 . . . TN;
wherein a similarity of the expired second change in relative position and the future second change in relative position is taken into consideration by a second area of relative movement in that at least one of the change in relative position of the second object and the property of the second object is classified; and
wherein the second area of relative movement is defined taking into consideration the properties of the future change in relative position assigned by the classification of the change in relative position and the second properties of the second object assigned by the classification of the second object, respectively.

\* \* \* \* \*